United States Patent [19]

Watts et al.

[11] Patent Number: 5,031,156

[45] Date of Patent: Jul. 9, 1991

[54] METHOD AND APPARATUS FOR DETECTING AND COUNTING ARTICLES

[75] Inventors: Leonard A. Watts, North Miami Beach, Fla.; William A. Johnson, Holliston; Charles E. Sawabini, Brighton, both of Mass.

[73] Assignee: EDS Technologies, Inc., Hialeah, Fla.

[21] Appl. No.: 449,444

[22] Filed: Dec. 12, 1989

Related U.S. Application Data

[63] Continuation of Ser. No. 876,486, Jun. 20, 1986, abandoned.

[51] Int. Cl.[5] .................... H01S 15/04

[52] U.S. Cl. .................... 367/95; 367/13; 377/8

[58] Field of Search .................... 367/87, 93, 95, 96, 367/100, 117, 124, 126; 209/537; 377/8; 235/98 C, 98 R

[56] References Cited

U.S. PATENT DOCUMENTS

| | | | |
|---|---|---|---|
| 3,543,930 | 1/1970 | Delbridge et al. | 377/8 |
| 3,545,674 | 12/1970 | Hanibicki | 235/98 |
| 3,589,599 | 6/1971 | Brandt | 235/98 |
| 3,702,925 | 11/1972 | Anderson et al. | 235/98 R |
| 3,720,311 | 3/1973 | Harrison, Jr. | 367/191 |
| 3,746,841 | 7/1973 | Fenske | 235/92 PK |
| 3,813,522 | 5/1974 | McCarthy | 235/98 R |
| 3,891,960 | 6/1975 | Widner | 367/104 |
| 4,439,844 | 3/1984 | Menin | 367/87 |
| 4,460,987 | 7/1984 | Stokes et al. | 367/103 |
| 4,528,679 | 7/1985 | Shahbaz et al. | 367/108 |
| 4,576,286 | 3/1986 | Buckley et al. | 367/96 |

FOREIGN PATENT DOCUMENTS

| | | |
|---|---|---|
| 0049681 | 4/1982 | European Pat. Off. . |
| 2011613 | 7/1979 | United Kingdom . |

OTHER PUBLICATIONS

Panasonic Ad., Playboy, Jan. 1988, p. 72.

*Primary Examiner*—Daniel T. Pihulic
*Attorney, Agent, or Firm*—Finnegan, Henderson, Farabow, Garrett & Dunner

[57] ABSTRACT

Articles, moving along a delivery path, are counted by directing a stream of pressurized air toward one major surface of the passing articles, the direction of the air stream being transverse to the direction of travel. Sensors arranged about the air stream detect the acoustic signal which varies with changes in the profile of the passing articles, exemplified by signatures. The detected acoustic signal is divided into a plurality of frequency ranges which, in one preferred emboidment, are averaged to reduce the effect of noise which may be present in only limited ones of the frequency bands. The averaged signals are then compared against thresholds to determine the instantaneous state of the articles, exemplified by a signature stream, to generate count signals.

37 Claims, 10 Drawing Sheets

WAVEFORMS WITH PAPER SPEED OF 144 FT./MIN.

WAVEFORM WITH PAPER SPEED OF 461 FT./MIN.

WAVEFORM WITH EIGHT FOUR-PAGE SECTIONS (TWO SECTIONS ARE CUT AWAY TO CREATE SPACE)

METHOD AND APPARATUS FOR DETECTING AND COUNTING ARTICLES

This application is a continuation of application Ser. No. 876,486, filed June 20, 1986 now abandoned.

FIELD OF THE INVENTION

The present invention relates to article detection; and more particularly to a method and apparatus for detecting and counting articles or objects utilizing acoustics.

BACKGROUND OF THE INVENTION

Modern day manufacturing plants process, treat, inspect, segregate, transport, and otherwise handle articles or objects at extremely high speeds. Many such applications require the reliable detection and counting of relatively fast moving objects. For example, newspaper publishing plants typically deliver signatures to the mail room at the rate of 80,000 per hour or more, for purposes of being formed into signature bundles of an accurate, predetermined count, which bundles are then wrapped or tied and delivered to various locations for sale or subsequent delivery.

Many of the articles have distinctive profiles that may be used for detection purposes. In the present example, the signatures are typically delivered in an overlapping stream with folded edges forward. The folded forward edges have typically been utilized for counting and stacking purposes. Counters of the mechanical or optical type are typically employed for counting articles, such as signatures, in the stream by simply and accurately identifying the passage of the folded forward edge or the nose of a signature. However, mechanical signature counters have the disadvantage of wearing after prolonged use. Optical systems become degraded due to the accumulation of dust or dirt on the optical components.

It is therefore desirable to provide a method and apparatus for detecting and counting which does not experience wearing suffered by mechanical counters and which does not become degraded due to accumulation of foreign matter upon the sensing elements as is the case with counters of the optical type.

SUMMARY OF THE INVENTION

An object of the present invention is to provide a method and system for monitoring and counting articles which does not require physical engagement of any portion of the apparatus with the article.

Another object of the present invention is to provide a method and system for monitoring and counting articles and which does not depend on a light source for effecting the detection or count.

Still another object of the present invention is to provide a method and system for monitoring and counting articles capable of discriminating between distinctive profiles of the articles.

Still another object of the present invention is to provide an improved method and system for detecting and counting signatures.

Additional objects and advantages of the invention will be set forth in the description which follows and in part will be obvious from the description, or may be learned by practice of the invention. The objects and advatanges of the invention may be realized and attained by means of the instrumentalities and combinations particularly pointed out in the appended claims.

To achieve the objects, and in accordance with the purpose of the invention, as embodied and broadly described herein, a method is provided for monitoring articles delivered along a path comprising directing a stream of air toward the articles, sensing interaction between the air stream and the articles; generating a signal which varies in accordance with the sound waves generated by the interaction; and monitoring the articles in accordance with the variations in the the generated signal.

In another aspect of the invention, there is provided apparatus for monitoring articles delivered along a path, comprising means for directing a stream of air toward the articles; sensor means positioned to sense interaction between the air stream and the articles; means governed by the sensed interaction for generating a signal which varies in accordance with the sound waves generated by the interaction; and means responsive to the generated signal for monitoring the articles.

DETAILED DESCRIPTION OF THE PREFERRED EMBODIMENTS

Figure 1A:
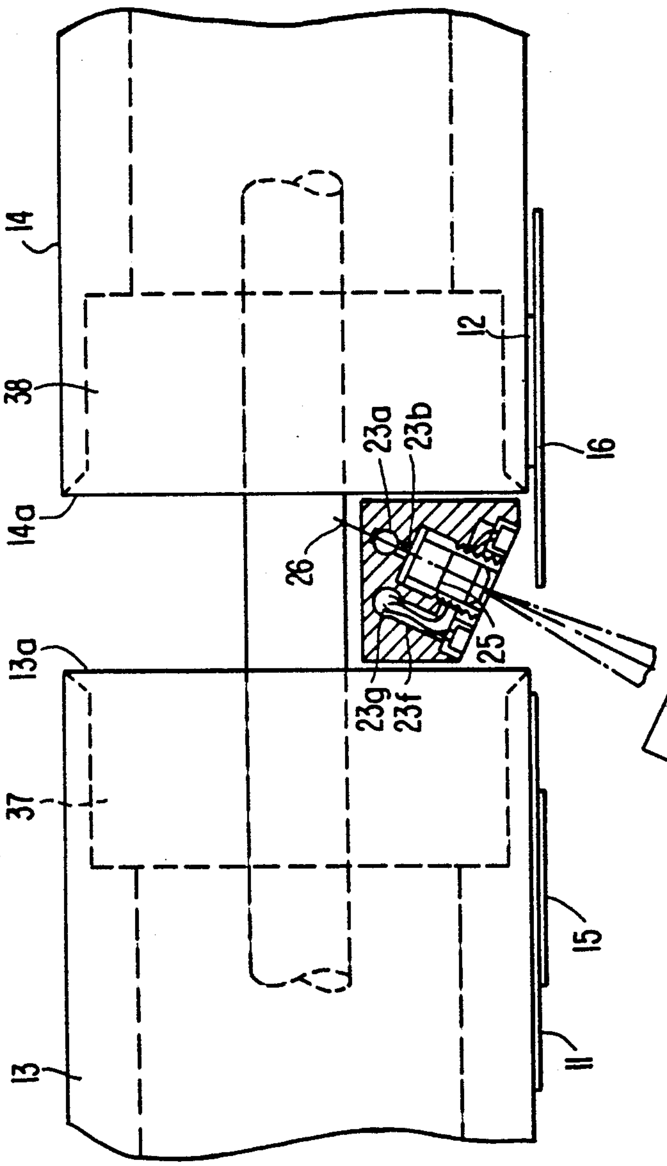
FIGS. 1*a*, 1*b*, and 1*c* respectively show side, end and bottom views of a sensor head assembly designed in accordance with the preferred embodiment of the invention.
Figure 1C:
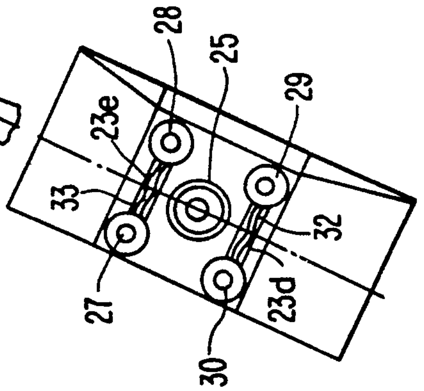
Figure 1B:
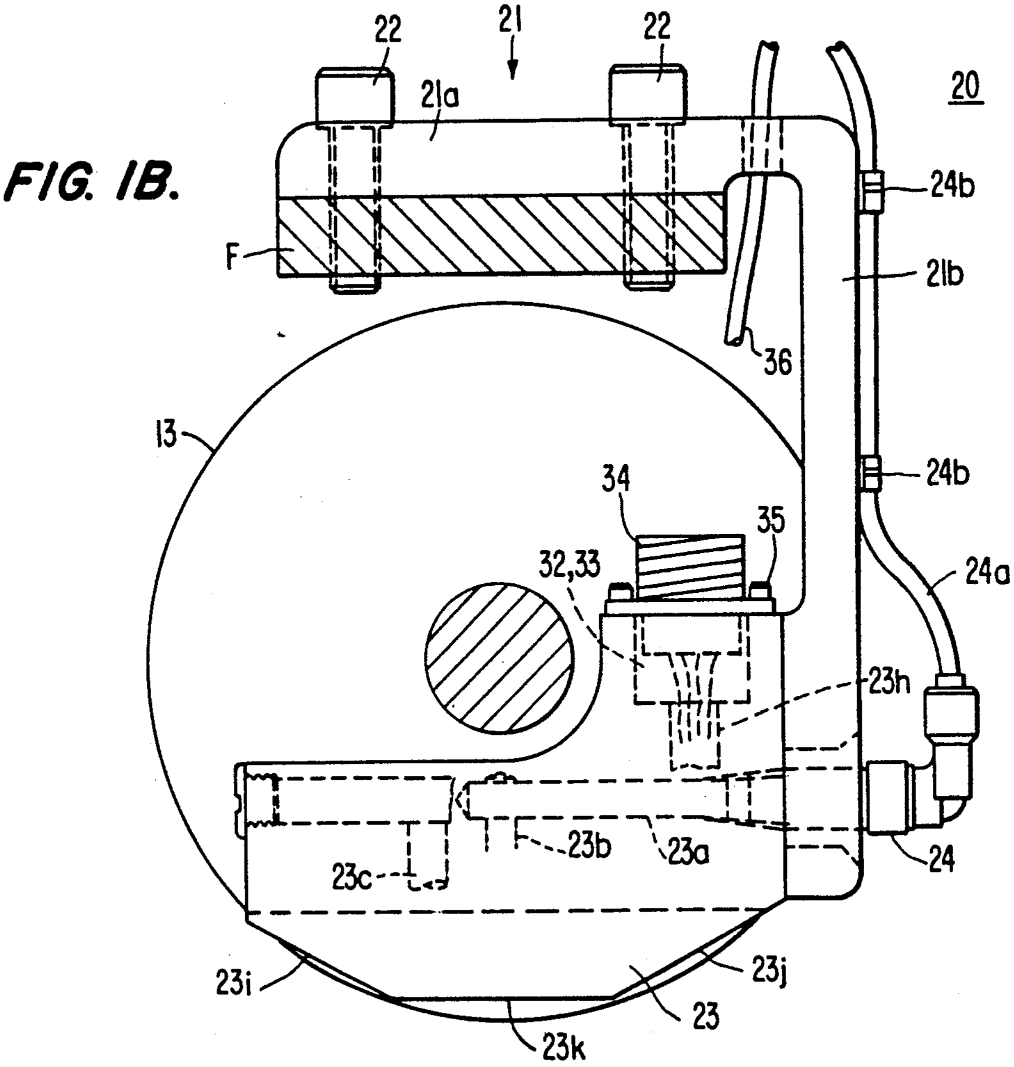

FIGS. 1*a*, 1*b*, and 1*c* show side, end and bottom views of a sensor head assembly 20 embodying the principles of the present invention. The sensor head assembly is utilized within a conveyor system including a plurality of top belts 11 and 12 engaging rollers 13 and 14, only portions of which have been shown in FIG. 1*a* for purposes of simplicity.

Bottom belts 15 and 16 cooperate with top belts 11 and 12 respectively for receiving signatures therebetween and advancing said signatures to a utilization device. It should be understood that the conveyor arrangement of FIG. 1*a* is highly simplified, such conveyor arrangements being well known in the art. The sensor assembly 20 of the present invention is typically arranged within the infeed section of a signature stacker having cooperating sets of top and bottom belts for receiving the signatures from a press conveyor and delivering the signatures toward the signature supports of a stacking section in the stack for accumulating a predetermined number of signatures for each stack. A typical stacker in which the present invention may be utilized is shown, for example, in our copending application Ser. No. 876,490 filed concurrently herewith and assigned to the assignee of the present application, said disclosure being incorporated herein by reference thereto. It should be understood that the sensor assembly of the present invention may be employed in other types of signature stacker and/or any processing or conveying apparatus, or signature conveying means, in which it is desired to sense and/or count signatures as the case may be.

The sensor assembly 20 is positioned between the facing inner ends 13*a* and 14*a* of rollers 13 and 14 and includes a substantially L-shaped bracket 21 having a horizontally aligned arm 21*a* secured to a stationary member F by fasteners 22, said support member F being secured to or forming part of the main frame of the signature stacker or other signature conveyor means A supporting block 23 is secured to the lower end of downwardly depending arm 21*b* by suitable fastening means (not shown) and has a substantially J-shaped configuration when viewed as shown in FIG. 1*b*. A narrow elongated horizontally aligned bore 23*a* communicates with an L-shaped coupling 24 having its left-hand end secured to the right-hand end of bore 23*a* for coupling a regulated air supply to bore 23*a* by way of air supply conduit 24*a* which is retained against the right side of arm 21*b* by hold-down clamps 24*b*.

A diagonally aligned short bore portion 23*b* in block 23 communicates with bore 23*a* and is adapted to receive a nozzle 25 fitted into large diameter bore 23*c* which communicates with bore 23*b*. The nozzle 25 is arranged so that its center line, represented by phantom line 26 shown in FIG. 1*a*, is diagonally aligned relative to the horizontal direction, i.e. relative to top and bottom belts 11, 12 and 15, 16. In the preferred embodiment, the longitudinal axis 26 of the nozzle forms an angle of the order of 25 degrees with the vertical.

A plurality of microphones 27, 28, 29 and 30 are arranged to lie upon an imaginary circle at equispaced intervals about nozzle 25 as shown best in FIG. 1*c* and are electrically coupled into the processing circuitry, as will be more fully described. The use of four microphones enhances the directional characteristics and hence the sensitivity of the sensor head to the detection of signatures as opposed to ambient noise. Channels 23*d* and 23*e* in block 23 are provided for receiving the electrical wiring 32, 33 utilized for electrically connecting the microphones 27 through 30 with the processing circuitry. These channels are preferably covered with a suitable sealing material after assembly. The electrical wires 32 and 33 extend upwardly through a diagonally aligned wiring duct 23*f* which communicates with a horizontally aligned wiring duct 23*g* which in turn communicates with a vertically aligned wiring duct 23*h* whose upper end receives an electrical connector 34 secured to an upper face of support 23 by fasteners 35. A cooperating coupling connector (not shown for purposes of simplicity) electrically couples the microphones 27 through 30 through wiring 36 for connection with the processing circuitry which is preferably located remote from the signature conveyor of FIG. 1*a*.

In order to enhance the effectiveness of sensor head 20 and reduce the effect of ambient noise, the hollow interiors of rollers 13 and 14 are filled at their ends 13*a* and 14*a* with a suitable acoustic dampening material as shown in dotted fashion at 37 and 38.

The diagonal alignment of the pressurized air stream developed by nozzle 25 prevents the air stream from striking the bottom belts, such as, for example, belt 16, in the absence of a signature stream in order to prevent the interaction of the air stream with the bottom belt from being erroneously detected as indicating a "paper" state.

The bottom surface of the support block 23 is provided with diagonally aligned trailing and leading surfaces. The leading surface 23*j* (note the direction of stream flow shown in FIG. 1*b*) guides the signatures beneath the bottom surface 23*k*, through which the pressurized air stream exits.

As was mentioned hereinabove, and as will be described in further detail hereinbelow, the microphones are arranged as an array physically. Physically, the microphones 27, 29 are located along an imaginary diameter as are the microphones 28, 30. All of the microphones 27 are arranged at equispaced intervals about an imaginary circle whose center coincides with the longitudinal axis 26 of nozzle 25.

In the actual reduction to practice of the described embodiment, favorable results were achieved with the following parameters. In order to reduce "self noise", i.e. the noise created by pressurized air passing through the nozzle with no paper present, the bore length of the nozzle is selected to be between 0.5 and 1 inches and is preferably a length of the order of 0.9 inches. The bore diameter lies in a range from 0.03 to 0.05 inches and is preferably of the order of 0.042 inches.

The nozzle pressure has been selected to be of a pressure magnitude sufficient to provide an adequate acoustic signal and yet not too large in magnitude as to create high nozzle "self noise". The pressure range lies between 20 and 50 psi and preferably is in the range from 30 to 40 psi. The separation between the nozzle and the signature surface is preferably selected to avoid excessively strong reflection of the pressurized air stream off the paper which makes it difficult to detect edges and also to prevent generation of a signal which is too weak to reflect off the paper causing the "paper" condition appear to be very similar to the "space" condition i.e. the condition when no signatures are present. The spacing between the bottom surface 23*k* of block 23 and the top surface of the signature stream is preferably in the range from 0.25 to 1.5 inches with the preferred sensor to paper distance being of the order of 0.45 inches. The outlet end of nozzle 25 in the preferred embodiment is preferably substantially flush with surface 23*k*.

The range of paper speed over which the counter is capable of operating is from 0 to 450 feet per minute. An increase in the delivery rate of the signature stream tends to reduce signal amplitude of the acoustic signal. Although the above parameters provide favorable results when detecting and counting signatures, it is anticipated that other parameters including nozzle dimension, pressure, and spacing may be required for other articles.

Figure 2:
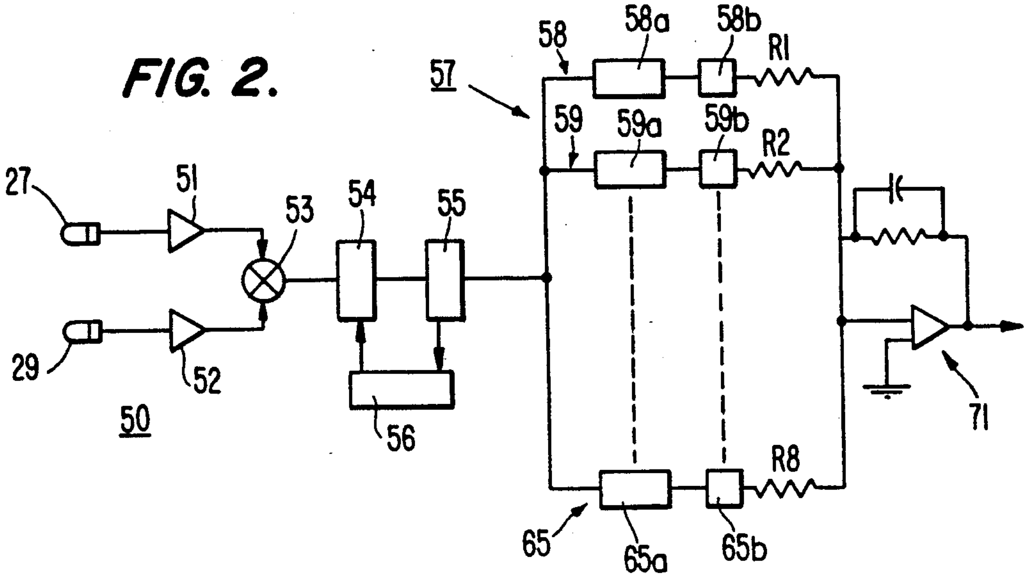
FIG. 2 shows a simplified block diagram of the electrical system utilized for analyzing the acoustic signals detected by the sensor of FIGS. 1*a*, 1*b*, and 1*c*, in accordance with a preferred embodiment of the invention.

FIG. 2 shows a simplified block diagram of the front end electronics 50 and includes, for example, microphones 27 and 29 electrically connected to summing circuit 53 by preamplifiers 51 and 52. It should be understood that the outputs of all four microphones 27 through 30 may be summed, the exmple given herein being merely for purposes of simplicity. The summed output is applied to gain control circuit 54 and limiter 55 for gain control, filtering, and limiting. The output of limiter 55 is applied to automatic gain control circuit 56 for regulating the gain of gain control amplifier stage 54. The output of limiter 55 is coupled in common to an eight (8) band spectral analyzer 57 each band 58 through 65 respectively containing a band pass filter 58*a* through 65*a* and an RMS-DC converter circuit 58*b* through 65*b*.

Figure 4:
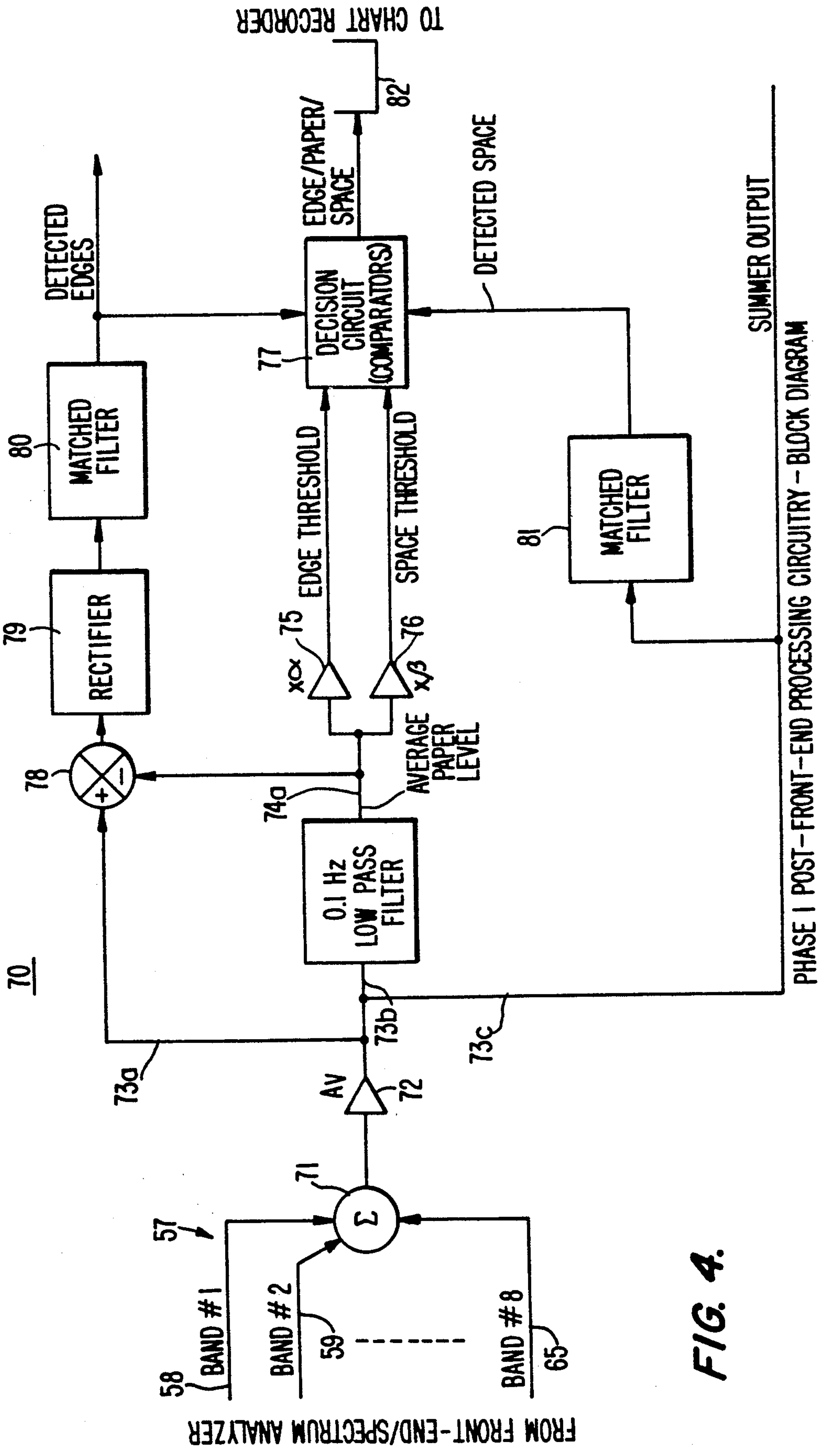
FIG. 4 shows a simplified block diagram of the post front end processing circuit for processing the signals developed by the front end circuit of FIG. 2, in accordance with a preferred embodiment of the present invention.

The outputs of each of the bands 58 through 65 are coupled to a summing circuit 71 forming part of the post front end processing circuit 70 shown in block diagram form in FIG. 4. The output of summing circuit 71 is coupled through amplifier 72 which amplifies the output of summing circuit 71 and couples the amplified output to three circuit paths 73*a*, 73*b*, and 73*c*. The circuit path 73*b* couples the averaged signal to low-pass filter 74 for developing a signal at the output of filter 74 representative of the average paper level. The average paper level represents the signal level (i.e. "paper") when the portion of the signature between its leading and trailing edges is passing beneath microphones 27 through 30. The average paper level signal is applied to threshold generating stages 75 and 76 which develop "edge" and "space" threshold levels respectively, which levels are coupled to decision circuit 77 which comprises of comparators, as will be more fully described, for dynamically determining the state of the signature stream, as will be more fully described.

Branch circuit path 73*a* contains a difference circuit 78 which receives the summed output of the spectral analyzer 57 and subtracts therefrom the average paper level. The difference is applied to rectifier circuit 79 and matched filter 80, the output signal of which is utilized by decision circuit 77 for comparison with the edge threshold level to detect the presence of edges.

Circuit path 73*c* couples the summed output from spectral analyzer 57 through matched filter 81 to apply a detected space signal to decision circuit 77 which compares the detected space signal with the space threshold level for detecting the presence of a space condition. The matched filters 80 and 81 are "matched" to low-pass filter 74 to match the transient response in each branch circuit 73*a*, 73*c* with the transient response in circuit branch 73*b* to assure that the signals being compared are substantially in time synchronism.

Rectifier 79 is a half-wave rectifier for passing only the upper half of the a.c. type signals. The matched filters filter out signals which are shorter than one millisecond while passing the edge signals.

Figure 7A:
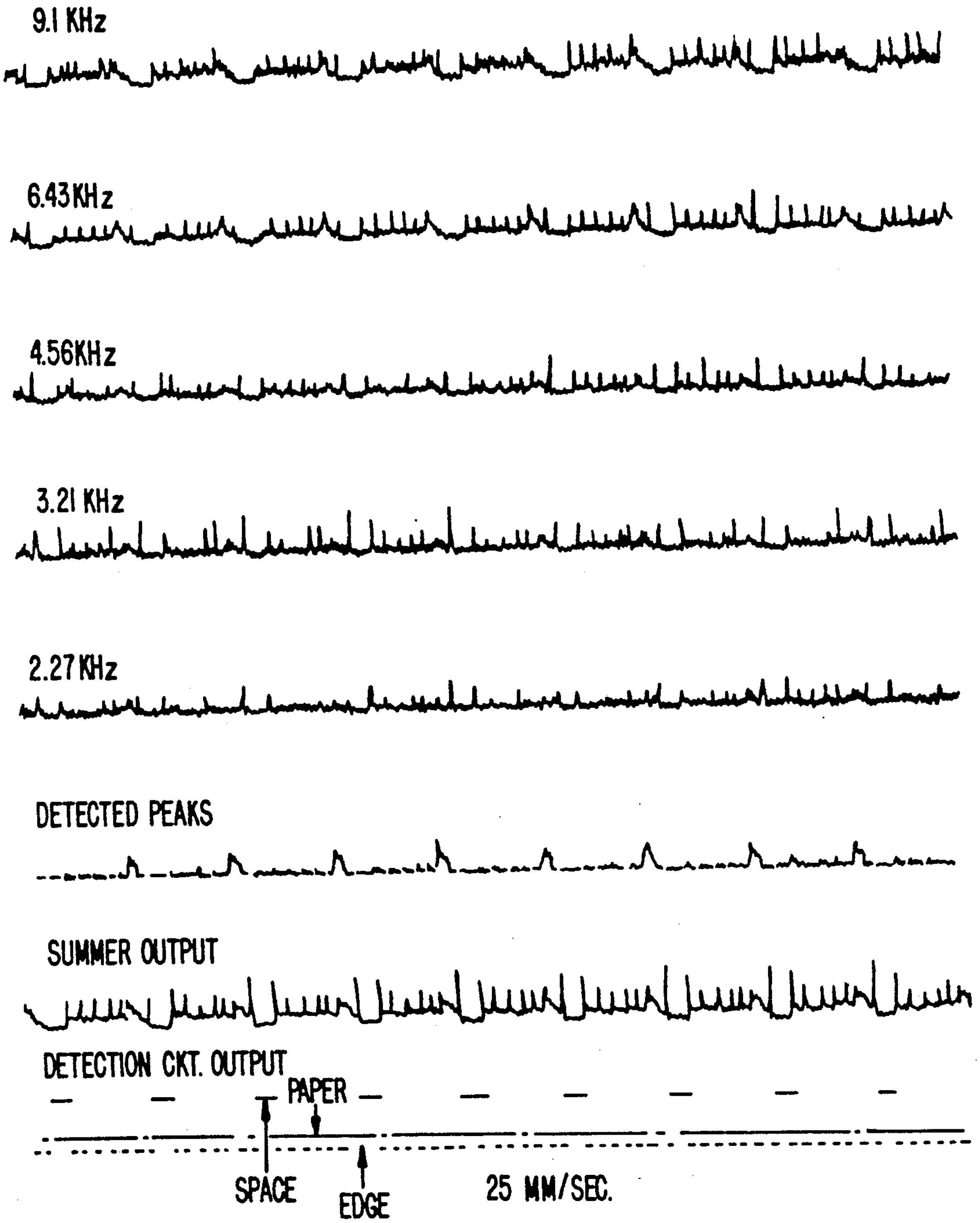
FIGS. 7*a*, 7*b*, and 7*c* show a signature stream and waveforms useful in describing the operation of the preferred embodiment of the present invention.
Figure 7B:
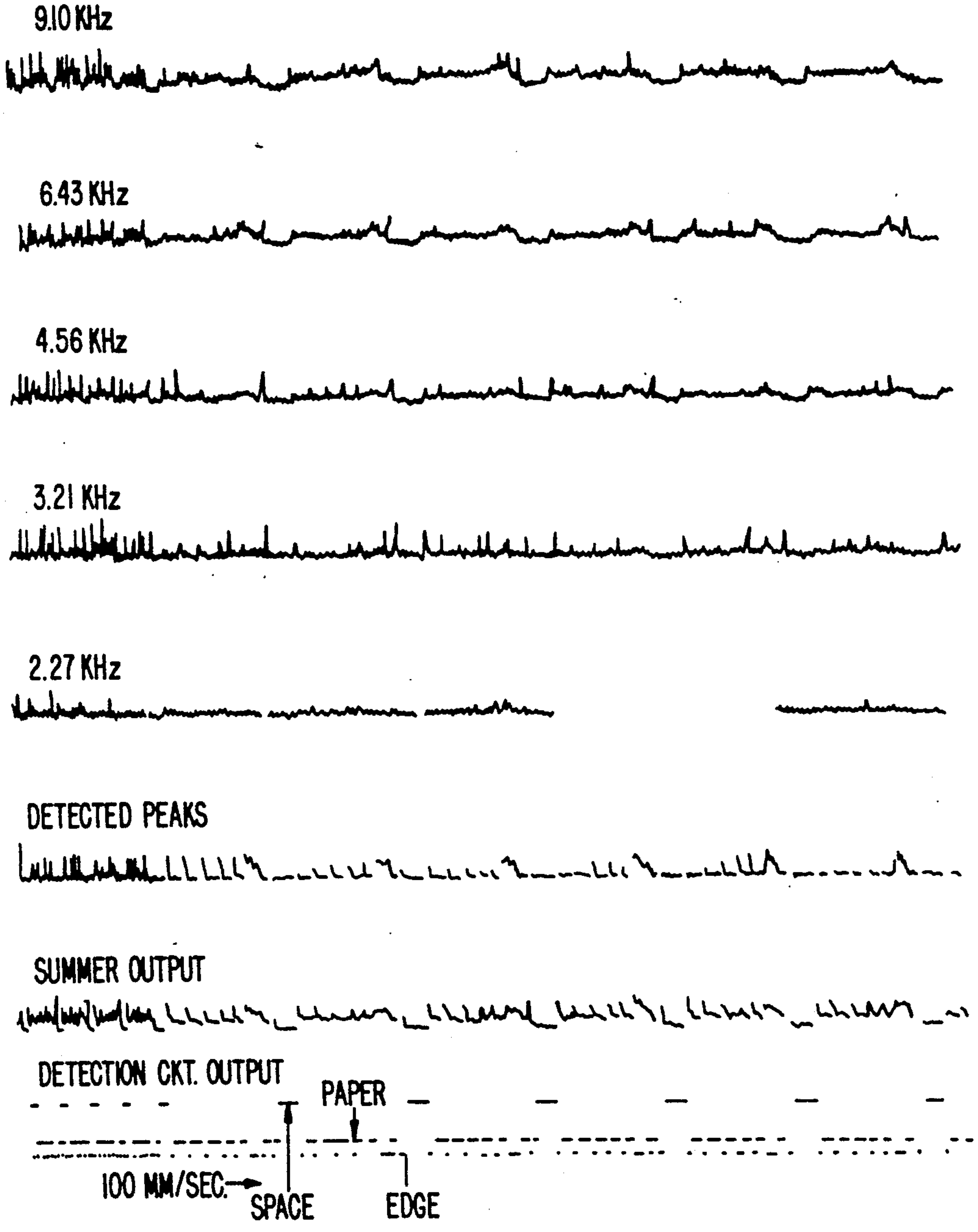
Figure 7C:
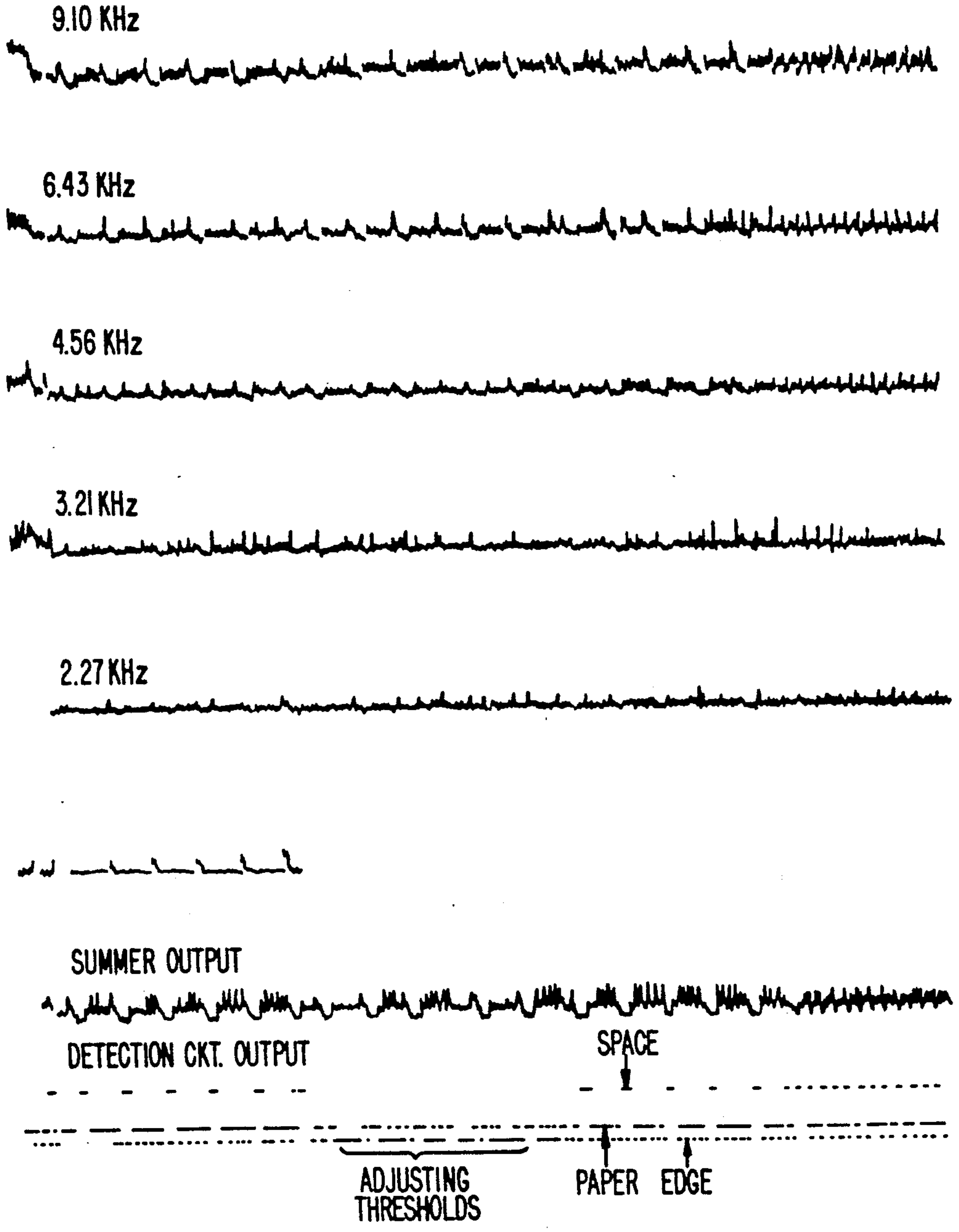

The operation of the apparatus shown in FIGS. 2 and 4 will now be considered in conjunction with the diagrams shown in FIGS. 7*a*, 7*b*, and 7*c*.

Nozzle 25 (see FIG. 1*a*) emits a jet of compressed air to generate a distinct sound as the edge of a newspaper (FIG. 7*a*) passes through the air jet. Microphones 27 through 30 are strategically arranged to allow the acoustic signal to be detected (preferably to the exclusion of ambient noise) and processed.

The nozzle/microphone sensor head 20 detects not only the leading edges L of signatures S (FIG. 7*a*), but detects the trailing edges T of the signatures when gaps G appear in the signature stream. Since the sound produced by a trailing edge is not radically different from the sound produced by a leading edge, the detector/counter system is provided with additional intelligence for differentiating between leading (typically "folded") and trailing (typically "out") edges of signatures.

The technique employed in the system of the present invention initially defines three states which can exist in the region of nozzle 25. The first stage is the "space" state which exists when no paper is present beneath the nozzle. This state produces the weakest signal at microphones 27 through 30 since no paper is present to reflect compressed air back toward the microphones 27 through 30, the pressurized jet of air being arranged to avoid striking and thus being reflected from either the top belts 11, 12 or the bottom belts 15, 16.

The second state is the "edge" state where the edge encountered (either the leading or trailing edge) is interrupting the jet of compressed air. This state produces the strongest signal at the microphones 27 through 30.

The final state is the "paper" state which exists when the portion of the signature between its leading and trailing edge is passing beneath the nozzle and is interrupting the pressurized air stream.

The counter system of the present invention examines the processed signals from the microphones 27 through 30 and determines the current nozzle state ("space", "edge", or "paper"). Knowledge of the current state plus the previous history allows the system to properly identify a single signature (space-edge-paper-edge-space); multiple overlapping signatures (space-edge-paper-edge-paper-. . . ); and certain types of false triggers (e.g., space-edge-space). The intelligence is embodied in the state determining circuitry shown in FIG. 4. The output of this circuitry develops a pulse per valid leading edge which is passed, for example, to a counter 82 (see FIG. 4) to tally the number of papers. The signal may also be employed to activate stacker apparatus, if desired.

The signals detected by microphones 27 through 30 undergo amplification by preamplifiers 51 and 52 (FIG. 2). The signals are mixed at 53 and undergo gain control amplification at 54 and are then coupled to limiter circuit 55. Limiter 55 further includes filtering means to reduce out-of-band noise, providing roll off below 200 Hz and roll off above 27 kHz, in the preferred embodiment. This filtering can be accomplished at both the input stage and mixer gain stage as will be more fully described in conjunction with the description of FIGS. 3*a* and 3*b*.

The output from limiter 55 is applied to spectral analyzer 57 which, in the preferred embodiment is an eight band ½-octave real-time spectral analyzer. Each band passes frequencies within its respective one-half octave range by filters 58*a* through 65*a* and thereafter performs a detection operation by way of RMS/DC converter 58*b* through 65*b*. The signals developed by each of the eight bands are summed by summing circuit 71 which acts to average the results. A form of majority-vote action results, since noise present in only one of the bands 58 through 65 is reduced by the averaging operation.

The output from summer 71 (FIG. 4) after voltage amplification, is applied to low pass filter 74 which, in the preferred embodiment, is a 0.1 Hz low-pass filter for extracting the level associated with the nozzle "paper" condition described hereinabove. The thresholds for the "space" and "edge" conditions are then set proportional to the average "paper" level, allowing the processing circuitry of FIG. 4 to track the actual received signal level.

Electrical circuit path 73*c* couples the output of the summing circuit 71 to comparator circuit 77 for comparison with the derived space threshold employing suitable comparator means forming part of decision circuit 77 as will be described in greater detail hereinbelow. If the signal level in circuit path 73*f* drops below the space threshold, the space condition is detected. Matched filter 81 matches the transient response in circuit path 73*c* with the transient response in circuit path 73*b*.

The third electrical path 73*a* is employed to detect the edge condition. Although circuit path 73*a* could employ the same circuitry employed in circuit path 73*c* (i.e. only matched filter 80), improved performance can be obtained by utilizing the detected paper level derived from the output of low pass filter 74 to provide an offset which is subtracted from the output of summing circuit 71 by difference circuit 78, which step occurs prior to edge detection. The difference signal developed at the output of difference circuit 78 is rectified at 79 to pass only the upper half of the a.c. type signal, which signal then passes through matched filter 80 which couples the signal to an associated input of decision circuit 77. If the signal in circuit path 73*a* is greater than the threshold level representing an edge condition, an edge state signal is generated.

To reduce "self noise", i.e. noise created by the pressurized air passing through nozzle 25 with no signatures present, the nozzle bore length is adjusted to lie within the range from 0.3 to 1.5 inches and preferably of the order of 0.9 inches. The bore diameter is chosen to be within the range from 0.032 to 0.052 inches and preferably of the order of 0.042 inches to further optimize the reduction in self noise.

System sensitivity is enhanced by selecting nozzle pressure so that it is not so low as to cause too small a signal at the microphones and thus have low immunity from ambient noise and not so high as to generate an undesirable level of self noise. The optimal pressure range is between 25 and 45 psi and preferably of the order of 30 to 40 psi.

The separation distance between the bottom surface 23*k* of block 23 and the adjacent (top) surface of the signatures is preferably chosen so as not to be too small to result in an excessively strong reflection of the air stream off of the signature surface making edges difficult to detect. On the other hand, a separation distance which is too large results in a correspondingly weak reflection of the air stream off the signature, creating a paper condition similar to the space condition and further contributing to the difficulty of detecting edges. The optimal sensor to paper distance is of the order of 0.3 to 0.6 inches and is preferably of the order of 0.45 inches. The exit orifice of nozzle 25 is preferably flush with surface 23*k*. The nozzle 25 is retained in bore 23*c* by means of a toroidal-shaped member 25*a* whose upper end engages a flange on nozzle 25 and whose lower end threadedly engages the tapped lower end of bore 23*c*.

Figure 5:
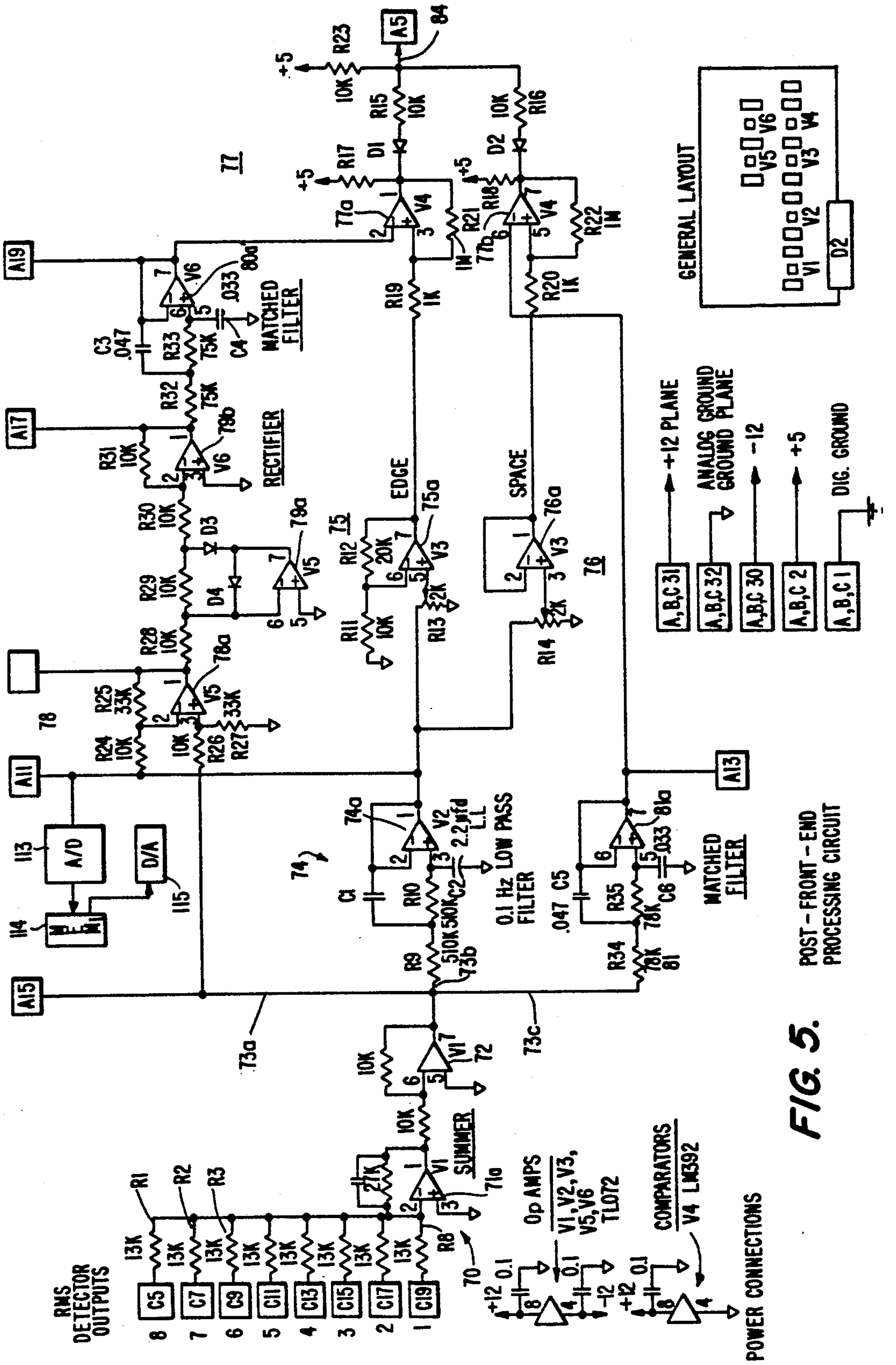
FIG. 5 shows a detailed schematic diagram of the post front end processing circuit of FIG. 4.

FIG. 5 shows a detailed schematic diagram of the post front end processing circuit of FIG. 4, summing circuit 71 including matched resistors R1 through R8 having their left-hand ends coupled to the output of the respective bands 58 through 65 of spectral analyzer 57 and having their right-hand ends connected in common to the inverting input of operational amplifier 71*a*. The output of the summer circuit 71 is coupled to the three branch circuits 73*a*, 73*b*, and 73*c* through amplifier stage 72. Low-pass filter 74 comprises of operational amplifier 74*a*, capacitors C1 and C2, and resistors R9 and R10. The output of low-pass filter 74 is applied to edge threshold generating circuit 75 including operational amplifier 75*a*, resistors R11 and R12, and adjustable resistance R13. A portion of the average paper level signal is applied to the non-inverting input of operational amplifier 75*a* whose gain is determined by the value of resistors R11 and R12 to develop an edge threshold signal.

The space threshold generating circuit 76 comprises operational amplifier 76*a* and adjustable resistance R14.

The decision circuit 77 comprises comparators 77*a* and 77*b*, the inverting inputs of comparator 77*a* and 77*b* being coupled to branch circuits 73*a* and 73*c* respectively while the non-inverting inputs receive the threshold levels from circuits 75 and 76. The outputs of comparators 77*a* and 77*b* are coupled in common to output terminal 84 through diodes D1 and D2 and resistors R15 and R16 whose right-hand terminals are connected in common terminal 84 which is coupled to +VDC through resistor R23.

Considering branch circuit 73*a*, difference circuit 78 comprises operational amplifier 78*a* having its inverting input coupled to the output of low-pass filter 74 by resistor R24, and its non-inverting input coupled to the summing circuit 71.

Rectifier 79 comprises operational amplifier 79*a*, diodes D3 and D4, resistors 28 through 31, and operational amplifier 79*b*, forming a half-wave rectifier for passing only the upper half of the acoustic signals. Matched filter 80 comprises operational amplifier 80*a*, resistors R32 and R33, and capacitors C3 and C4.

The matched filter 81 in branch circuit 73*c* comprises operational amplifier 81*a*, resistors R34 and R35, and capacitors C5 and C6. The matched filters are utilized to match the transient response in circuit branches 73*a* and 73*c* with that in branch 73*b* as was previously described.

Figure 3A:
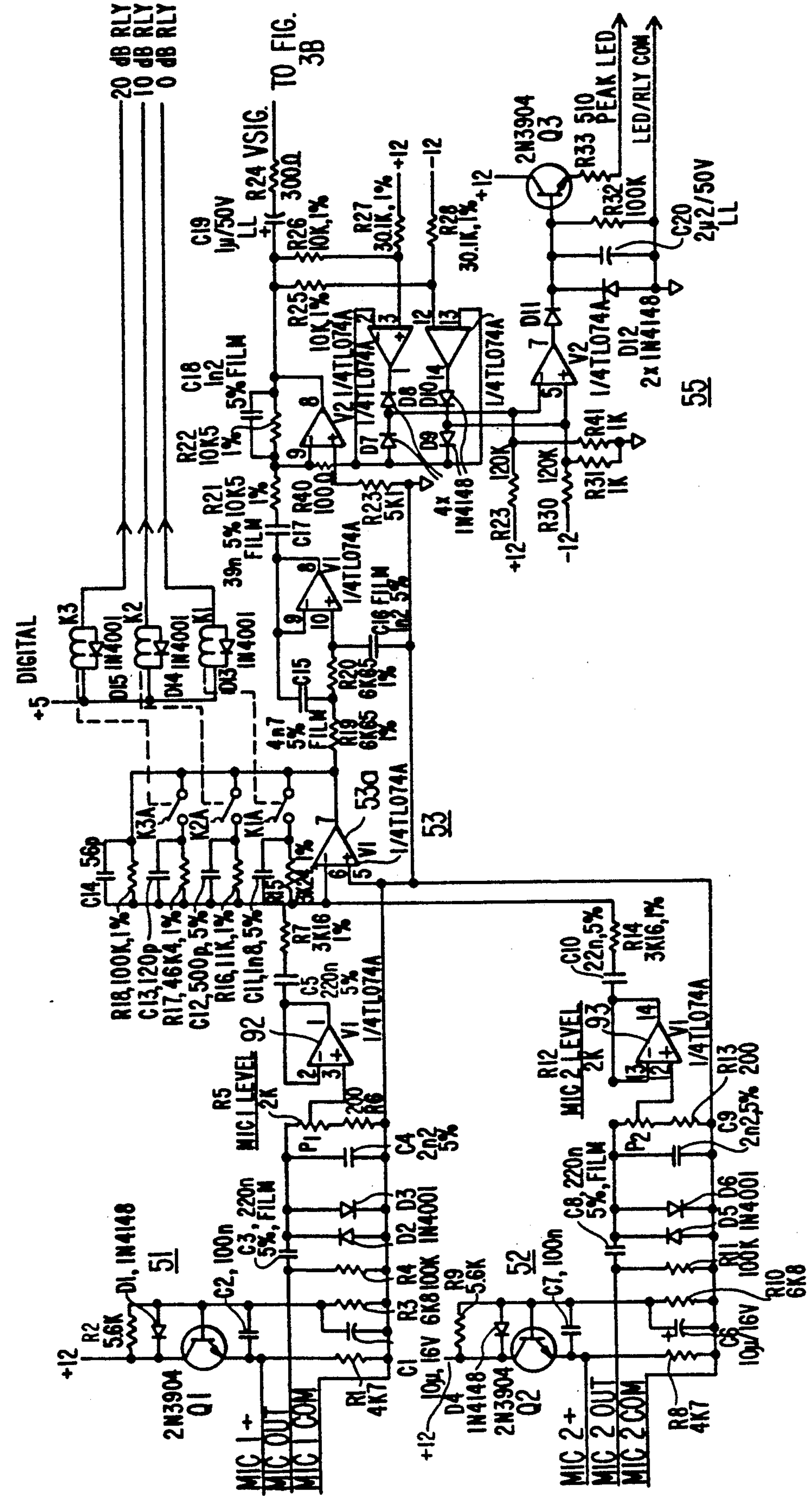
FIGS. 3*a* and 3*b* show portions of the block diagram of FIG. 2 in greater detail and in schematic form.

FIG. 3*a* shows a schematic diagram of the front end electronics in which the preamplifier stages 51 and 52, employing transistors Q1 and Q2 each of which develop an output signal at adjustable potentiometers P1 and P2 which are applied through operational amplifiers 92 and 93 to the mixer circuit 53 including operational amplifier 53*a* and an adjustable gain control circuit comprising feedback resistor/capacitor pairs C14, R18 through C11, R15 selectively coupled into the feedback circuit through the switch arms K1*a* through K3*a* of coils K1 through K3, respectively. The gain is adjusted by a gain control circuit (not shown in FIG. 3*a* for purposes of simplicity) for adjusting the gain in accordance with the level of the signal developed by limiter 55.

The limiter 55 comprises a low-pass filter section and a limiter with peak indication. The low-pass filter section eliminates signals at the upper end of the frequency band and, in one preferred embodiment, has a three db down point of the order of 16 kHz. The limiter section clips signals greater in magnitude than a predetermined voltage level which, in the embodiment shown, is of the order of ±4 volts DC.

Figure 3B:
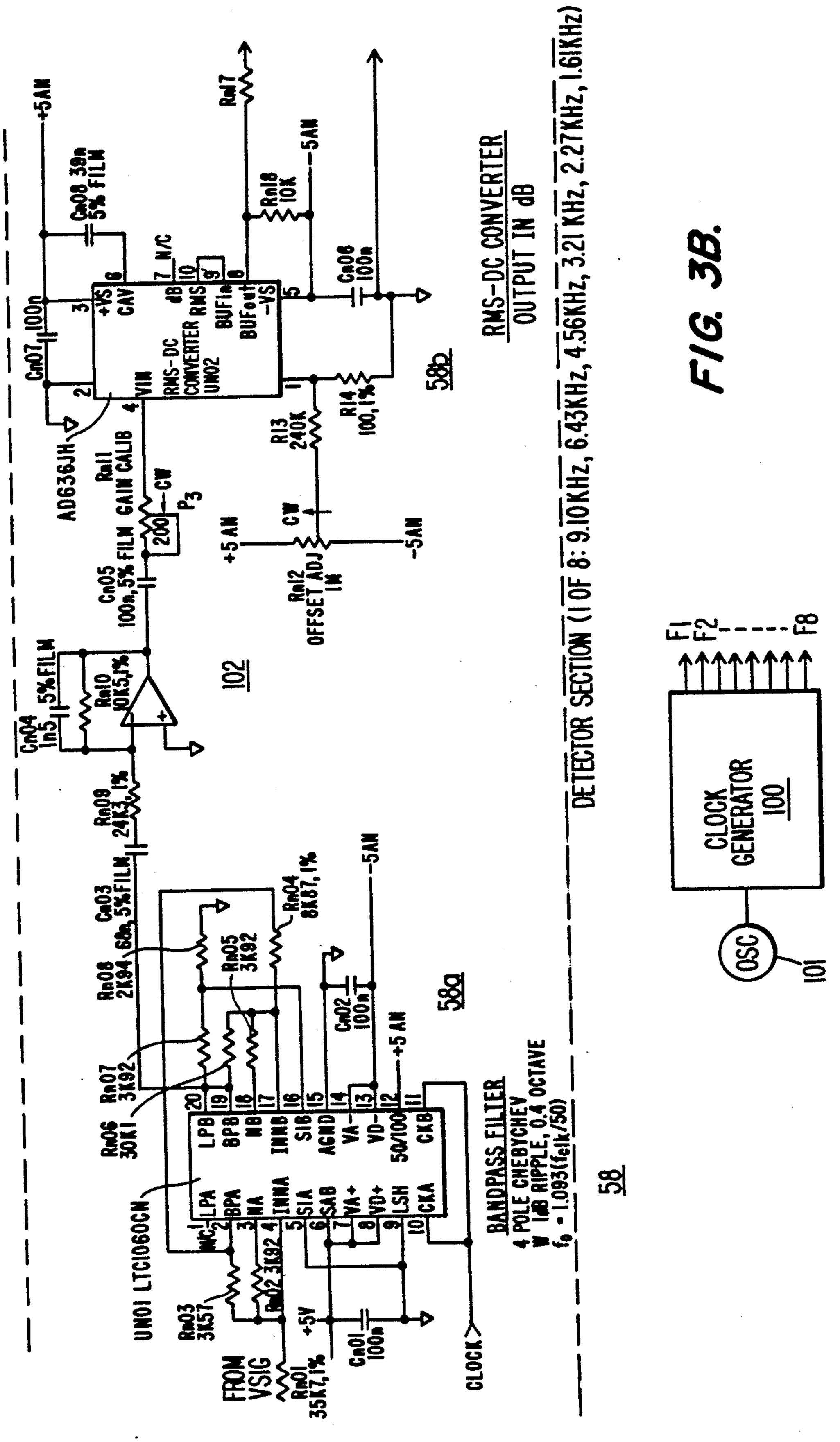

FIG. 3*b* shows on typical detector section such as, for example, section 58 shown in FIG. 2, all remaining sections being substantially the same in design and function with the difference between the eight sections being that each section is operated to pass a different one-half octave band. The detector section 58 comprises a band-pass filter of the four-pole Chebychev type. The signal from the limiter circuit of FIG. 3*a*, appearing at output line VSIG, is coupled to the inputs terminal INNA of a type LTC1060CN switched-capacitor filter circuit manufactured by Linear Technology. This chip operates as a commutating capacitor type filter operating at a frequency determined by the clock input applied in common to chip inputs CKA and CKB coupled to the clock input terminal labelled "Clock". The clock input coupled to the LTC1060CN chip in detector section 59 is coupled to one of the outputs of a clock generator 100 coupled to oscillator 101 which, in the preferred embodiment, operates at a frequency of 10 MHz. Clock generator 100 generates signals at its eight outputs $f_1$ through $f_8$ at frequencies which, in the preferred embodiment, are chosen to pass an output frequency in which detection stage is a fraction of the clock frequency. In one preferred embodiment, the one-half octave frequencies are 803 Hz; 1.14 khz; 1.61 khz; 2.27 khz; 3.21 khz; 4.56 khz; 6.43 khz; and 9.10 khz, although other bands may be employed if desired. For example, the number of bands may be increased to extend the range of 15 KHz or the lower bands may be limited and replaced by higher one-half octave bands. The clock signal provided at the input of each detector when divided by 50, yields the desired output. The signal, after undergoing amplification at stage 102 of detector 59 and after a gain calibration at potentiometer P3, is applied to an RMS/DC converter which may, for example, be a model AD636JH RMS/DC converter for converting the AC signal to a DC signal, which converted signal is summed by summing circuit 71 shown in FIG. 4, for example. As was mentioned hereinabove, each detector section is substantially similar in design with the difference being the frequency of the signal applied to the band pass filter chip by the clock generator.

Figure 6:
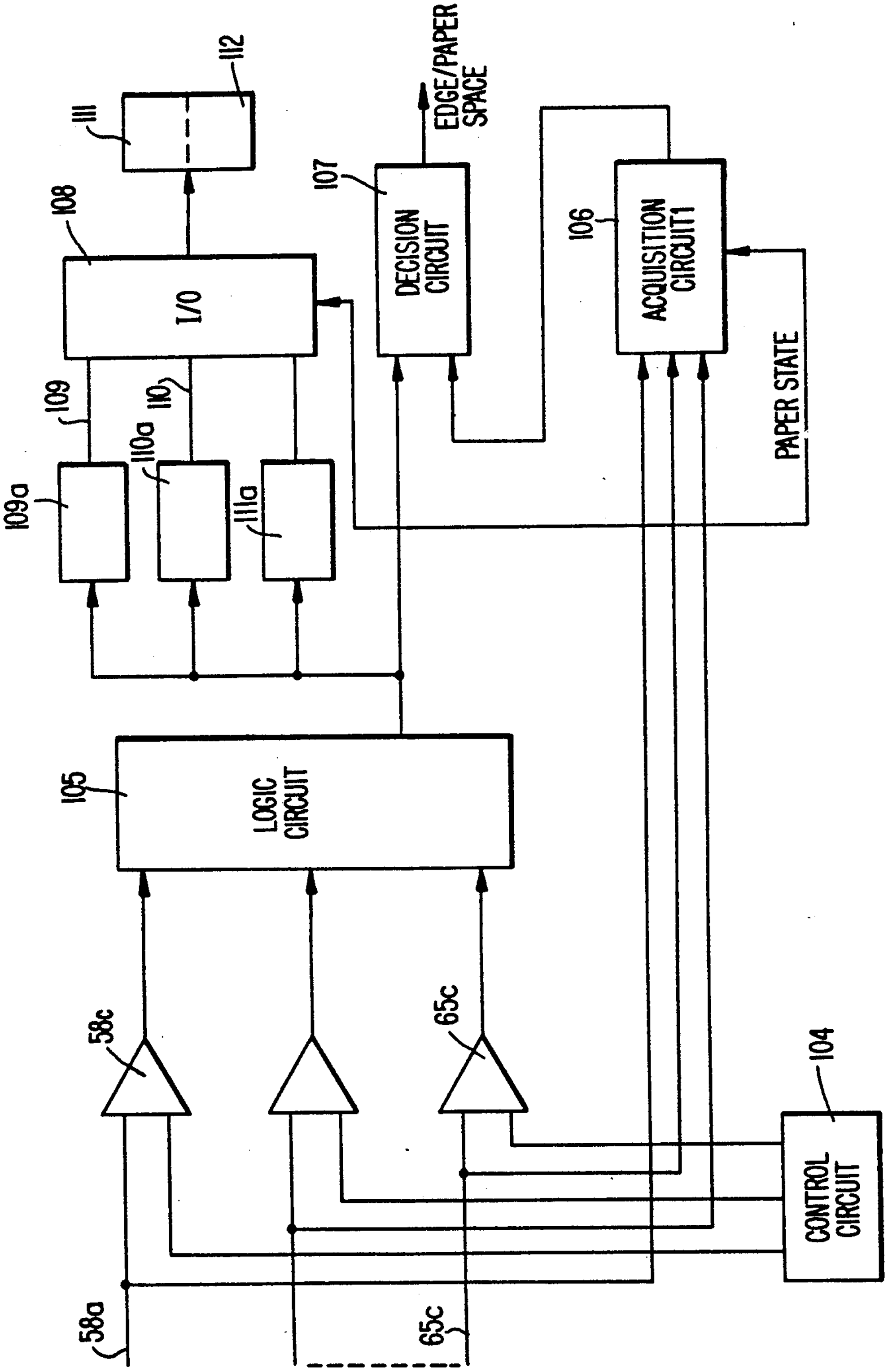
FIG. 6 shows a block diagram of an another preferred embodiment of a processing circuit of the present invention.

FIG. 6 shows another alternative embodiment of the present invention wherein like elements as between FIGS. 2 and 7 are designated by like numerals. In the embodiment of FIG. 6, the outputs of the detectors **58*a* through 65*a* in the bands 58 through 65 are coupled to individual comparators 58*c* through 65*c* which receive threshold signals from adaptive threshold control circuit 104 to apply the paper input condition to each one of the eight inputs of majority (voting) logic circuit 105. The paper state condition is applied to the characteristic aquisition circuit 106 together with the outputs of each band 58 through 65. The state determined by the majority logic circuit 105, together with the output of each detector section, is utilized by circuit 106 to adjust the "edge" and "space" threshold levels generated by circuit 104, which threshold levels are applied to the comparators 58*c* through 65*c*. The paper state is determined by circuit 107 which may for example be similar to the circuit 77 shown in FIG. 5. The paper state signal is applied to an I/O processor 108 which is selectively coupled to serial and parallel lines 109 and 110, display 111, and keyboard 112 by interfaces 109*a* through 112*a*** respectively.

Since the 0.1 Hz low pass filter employed in the post front end processing circuit shown in FIG. 5 requires at least a short interval of time, typically on the order of ten seconds or so, to arrive at what may be considered to be a "steady state" condition, the output from the low pass filter 74 may be applied to an A to D converter 113 and stored in digital form in a memory device 114 (FIG. 5). This "remembered" paper value may be initially utilized during system start-up by selectively decoupling the filter 74 from circuits 75, 76, and 78 and applying the stored digital value to a digital to analog converter 115 and applying the output of the D to A converter 115 to the threshold generating circuits 75 and 76 and to the difference circuit 78 employed in circuit path **73*a***.

In summary, the present preferred embodiment of the invention heretofore described in detail is exemplified by a signature counter which is employing a jet of pressurized air which is directed to one surface of the signature stream. The jet of air strikes the surface of the signature, generating signals of varying acoustical levels and frequency as a function of the profile of the signature passing through the jet of air.

Preferably, the acoustic signal generated by the interaction between the jet of pressurized air and the signature stream is detected by a plurality of microphones which convert the acoustic signal into an electrical signal whose amplitude and frequency are related to the amplitude and frequency of the acoustic signal.

The electrical signals generated by the microphones are preferably summed, amplified, limited, and filtered to reduce out-of-band noise.

The signal is then applied to a multiple band spectral analyzer, each band preferably having a one-half octave bandwidth.

The outputs of the spectrum analyzer are summed to essentially average the results. Preferably, the summed value is then split into three paths, one of which includes a low pass filter for extracting a level associated with the "paper" condition, i.e., the condition which exists when the portion of a signature between its leading and trailing edges moves beneath the jet of pressurized air. Thresholds for determining the edge and space conditions are derived from the "paper" condition and set so as to be proportional to the "paper" level. The circuit has the ability to track the received acoustic signals.

The second electrical circuit, or path, may include a matched filter, which couples the averaged output to a comparator for comparison with the space threshold. If the averaged output drops below the threshold, a space condition is detected. The edge condition is detected through the use of a third path which applies the averaged output through a matched filter to comparator means. The matched filters assure that the transient response in the three electrical paths are matched to assure proper comparison.

The microphones utilized for converting the acoustical signal to electrical signals are preferably arranged as in an array which are diagonally opposite the air jet nozzle. The pressurized air may be provided by a remotely located air compressor and regulator.

The bore of the air jet nozzle preferably has a length which is chosen to reduce "self noise", i.e., the noise created by pressurized air passing through the nozzle when no papers are present. The pressure level is selected to reduce the effects of self noise and yet to provide a signal having a signal strength sufficient to provide adequate immunity from ambient noise. The separation distance between the nozzle and the paper surface is selected to prevent an excessively strong reflection of the air stream off the paper when located too close to the paper surface and to prevent the generation of a correspondingly weak signal when the separation is too large, making it difficult to differentiate between a "paper" condition and a "space" condition. The nozzle may be oriented to be diagonally aligned relative to the paper surface of the signature to prevent the air stream from being reflected from the lower guide belt, in the example, and thus being erroneously detected as a "paper" condition, and further, for reducing the noise generated due to the interaction between the air jet and the surface of the signatures.

The system may be an "analog" type or may employ microprocessor-based control means for performing some of the functions otherwise performed by dedicated hardware through the use of software techniques. For example, the "paper" value extracted from the low pass filter may be converted from analog to digital form and stored in memory for use during initial start-up conditions to eliminate the time required for the low pass filter to stablize upon the initiation of a paper run. Thus, the initialized conditions may be utilized by the system processing circuitry during the time required by the "paper" state extraction circuit to reach the steady state condition.

Although the present preferred embodiment of the invention is described in detail in connection with detecting and counting signatures, it is intended that the method and system of the present invention may be used for sensing and counting other articles, as well.

Also, it will be apparent to those skilled in the art that various modifications and variations can be made in the method and system of the present invention without departing from the spirit or scope of the present invention. Thus, it is intended that the present invention cover the modificaitons and variations of this invention, provided they come within the scope of the appended claims.

What is claimed is:

1. Apparatus for monitoring articles delivered along a path comprising:
- means for directing an air jet toward the articles,
- sensor means positioned to sense frequencies and associated amplitudes of sound waves generated by acoustic interaction of said air jet with the articles;
- means governed by said sensed acoustic interaction for generating signals which vary in accordance with the frequencies and associated amplitudes of the sound waves generated by said acoustic interaction; and
- means responsive to said generated signals for monitoring first, second, and third states of said articles.

2. The apparatus of claim 1 further comprising means responsive to said generated signals for accumulating count signals.

3. The apparatus of claim 1 wherein the signal generating means generates electrical signals having amplitudes at selected frequencies that vary respectively in accordance with the amplitudes at corresponding frequencies of the sound waves.

4. An apparatus for counting signatures conveyed in a first direction along a path, comprising:
- means positioned adjacent the conveying path for transmitting a pressurized air jet in a second direction at an oblique angle to the first direction to interact with the individual signatures in succession;
- sensing means positioned adjacent the path for sensing sound waves having varying frequencies and associated amplitudes generated by the pressurized air jet interacting successively with the signatures moving along the path;
- means responsive to the varying frequencies and associated amplitudes of the sensed sound waves for generating signals characteristic of the interaction with respective signatures; and
- means responsive to said generated signals for counting said signatures in succession.

5. The apparatus of claim 4, wherein said sensing means comprises a plurality of sensors positioned around said air jet, each sensor generating an output signal having predetermined characteristics which vary in accordance with a frequency and associated amplitude of the generated sound waves.

6. The apparatus of claim 5 wherein said signatures are both overlapped and spaced.

7. The apparatus of claim 5 wherein said sensors are arranged at intervals about an imaginary circle surrounding said air jet.

8. The apparatus of claim 5 wherein the air jet transmitting means includes means for providing air pressure in the range of from approximately 30 to 50 psi.

9. The apparatus of claim 8 wherein the air pressure is of the order of 40 psi.

10. The apparatus of claim 5 wherein the air jet transmitting means comprises an exit nozzle having a bore coupled to a source of pressurized air and having a bore length approximately between 0.40 and 1.9 inches.

11. The apparatus of claim 10 wherein bore length is of the order of 0.9 inches.

12. The apparatus of claim 10 wherein said bore has a diameter in the range from approximately 0.03 to 0.06 inches.

13. The apparatus of claim 12 wherein bore diameter is of the order of 0.042 inches.

14. A method of monitoring articles delivered along a path, comprising the steps of:
- directing an air jet toward the articles;
- sensing frequencies and associated amplitudes of sound waves generated by acoustic interaction of the air jet with the articles;
- generating signals which vary in accordance with the frequencies and associated amplitudes of the sound waves generated by said acoustic interaction; and
- monitoring first, second, and third states of the articles in accordance with the variations in the generated signals.

15. A method for counting articles comprising the steps of:
- moving said articles so that at least a leading portion of each article is arranged at a spaced interval behind the leading portion of each adjacent downstream article, said articles being moved past a detecting location;
- directing an air jet for successively striking at least the leading portion of the articles as they pass the detecting location to interact with the moving articles for generating sound waves having varying frequencies and associated amplitudes;
- detecting the frequencies and associated amplitudes of the generated sound waves; and
- generating a detecting signal at times when a predetermined frequency is detected; and
- evaluating the amplitude associated with said predetermined frequency for generating a count signal per valid leading portion.

16. The method of claim 15 wherein said predetermined frequency comprises a sound wave having a frequency above 1,000 Hz.

17. The method of claim 15 wherein said detecting step further comprises converting the sound wave into an electrical signal having a frequency which is a function of the sound wave.

18. Detection apparatus for detecting at least one characteristic in a profile of articles moving along a delivery path, said apparatus comprising:
- means for directing a jet of pressurized air toward one surface of said articles, wherein interaction of the air jet with the articles generates an acoustic signal which varies with variations in the profile of the articles in the delivery path;

sensor means including a plurality of acoustoelectric sensors arranged about said air jet in a manner to enhance directivity of said sensor means, each sensor including means for generating an electric signal corresponding to said acoustic signal received by the sensor;

means for summing the generated electric signal of said sensors for obtaining a first output signal;

filter means coupled to said summing means for filtering out unwanted frequencies in the first output signals of said summing means;

a plurality of band pass channels each being coupled to said filter means for passing a predetermined frequency band, the frequency bands of each channel being different; and detection means responsive to the frequency bands of said channels for generating a first detection signal representative of a particular characteristic in said profile.

19. The apparatus of claim 18 wherein said detection means further comprises second summing means for summing the frequency bands of said band pass channels to obtain a second output signal;

means coupled to said second summing means for developing a predetermined threshold level; and first comparator means for comparing said threshold level with the second output signal from said second summing means for generating said detection signal when the second output signal of said second summing means is of a predetermined value relative to said threshold level.

20. The apparatus of claim 19 further comprising second threshold generating means coupled to said second summing means for generating a second threshold level for detecting a second characteristic of said profile;

second comparison means for comparing the output of said second summing means with said second threshold level for generating a second detecting signal when the output of said second summing means is of a predetermined value relative to said second threshold level.

21. The apparatus of claim 20 wherein said second threshold generating means comprises low-pass filter means extracting a level from the output of said second summing means representative of the second characteristic of said profile, and means coupled to said low-pass filter means for producing said second threshold level.

22. The apparatus of claim 21 further comprising a branch path for coupling the output of said second summing means to said second comparator means, said branch path having a matched filter for matching a transient response in said branch path with a transient response of said low-pass filter means.

23. The apparatus of claim 22 further comprising a second branch path for coupling the output of said second summing means to said second comparator means, said second branch path including match filter means for matching a transient response of said second branch path to the transient response of said low-pass filter means.

24. The apparatus of claim 23 wherein said second branch path further comprises means for subtracting an output of said low-pass filter means from said second summing means.

25. The apparatus of claim 24 wherein said second branch path further includes half-wave rectifier means for passing only signals of one polarity and means for converting said half-wave rectifier signals to a d.c. signal.

26. The apparatus of claim 18 wherein each said band pass channel comprises a band pass filter differing from each adjacent band pass filter by one-half octave.

27. The apparatus of claim 26 wherein said band pass filter means comprises a switched capacitor filter means.

28. The apparatus of claim 18 wherein each band pass channel comprises filter means for passing a predetermined frequency band and means for converting said frequency band of said filter means to a d.c. signal.

29. The apparatus of claim 28 wherein said filter means comprises a four-pole Chebychev filter.

30. A method for counting signatures conveyed in a first direction along a path, comprising the steps of:

transmitting a pressurized air jet in a second direction at an oblique angle to the first direction to interact with the individual signatures in succession;

sensing varying frequencies and associated amplitudes of sound waves generated by the pressurized air jet interacting successively with said signatures;

generating signals, in response to the varying frequencies and associated amplitudes of the sensed sound waves, characteristic of the interaction with respective signatures; and summing said signals for counting said signatures.

31. The method of claim 30 further including the step of positioning a plurality of sensors adjacent the path at intervals about an imaginary circle surrounding said air jet.

32. Apparatus for monitoring articles delivered along a path comprising:

means for directing an air jet toward the articles, sensor means positioned to sense interaction between said air jet and the articles;

means, including a spectrum analyzer, governed by said sensed interaction for generating a signal which varies in accordance with sound waves generated by said interaction; and means responsive to said generated signal for monitoring said articles.

33. An apparatus for counting spaced and overlapping individual signatures conveyed in a first direction along a path, comprising:

means positioned adjacent the conveying path for transmitting a pressurized air jet in a second direction at an angle to the first direction to interact with the individual signatures in succession;

sensing means positioned adjacent the path, including a plurality of sensors positioned around said air jet at equispaced intervals about an imaginary circle surrounding said jet, for sensing sound waves generated by the pressurized air jet interacting successively with the overlapping and spaced signatures moving along the path, each sensor generating an output signal having predetermined characteristics which vary in accordance with a frequency of the generated sound waves;

means responsive to the sensed sound waves for generating signals characteristic of the interaction with respective overlapping and spaced signatures; and means responsive to said generated signals for counting said overlapping and spaced signatures in succession.

34. A method for monitoring articles delivered along a path comprising the steps of:
directing an air jet toward the articles;
sensing interaction between said air jet and the articles;
generating a signal, using a spectrum analyzer governed by said sensed interaction, which varies in accordance with sound waves generated by said interaction; and
monitoring said articles in response to said generated signal.

35. A method for counting spaced and overlapped indiviudal signatures conveyed in a first direction along a path, comprising the steps of:
transmitting a pressurized air jet in a second direction at an angle to the first direction to interact with the individual signatures in succession;
positioning a plurality of sensors adjacent the path at equispaced intervals about an imaginary circle surrounding said air jet;
sensing sound waves generated by the pressurized air jet interacting successively with said signatures;
generating, from each sensor, an output signal having predetermined characteristics which vary in accordance with a frequency of the generated sound waves;
generating signals characteristic of the interaction with respective overlapping and spaced signatures; and
summing said signals for counting said signatures.

36. Apparatus for monitoring articles delivered along a path comprising:
means for directing an air jet toward the articles,
sensor means positioned to sense acoustic interaction between the air jet and the articles;
means, governed by said sensed interaction, including a spectrum analyzer for selecting a plurality of frequencies corresponding to frequencies of the sensed interaction, for generating a signal having an amplitude which varies in accordance with the amplitude of the selected frequencies;
means responsive to said generated signal for monitoring said articles.

37. A method for monitoring articles delivered along a path comprising the steps of:
directing an air jet toward the articles,
sensing acoustic interaction between said air jet and the articles;
selecting a plurality of frequencies corresponding to frequencies of the sensed interaction, with a spectrum analyzer governed by said sensed interaction;
generating a signal having an amplitude which varies in accordance with the amplitude of the selected frequencies; and
monitoring said articles in accordance with the generated signal.

* * * * *